United States Patent

Ito et al.

[15] 3,666,192

[45] May 30, 1972

[54] CARTRIDGE FOR ENDLESS TAPE

[72] Inventors: Fukuzo Ito, Yokohama-shi; Masaoki Sekine, Kawasaki-shi, both of Japan

[73] Assignee: Tokyo Denki Kagaku Kogyo Kabushiki, Kaisha, Tokyo-to, Japan

[22] Filed: Sept. 15, 1969

[21] Appl. No.: 857,980

[30] Foreign Application Priority Data

Sept. 16, 1968 Japan....................................43/66756

[52] U.S. Cl........................................................242/55.19 A
[51] Int. Cl.........................................................B65h 17/48
[58] Field of Search..........................242/55.19 A, 201–210; 74/665

[56] References Cited

UNITED STATES PATENTS 2,611,284 9/1952 Albee......................................74/665
3,489,362 1/1970 Linning..............................242/55.19

*Primary Examiner*—Leonard D. Christian
*Attorney*—Blum, Moscovitz, Friedman & Kaplan

[57] ABSTRACT

This invention relates to an endless tape cartridge having a hub on which a looped endless tape is wound up in a convoluted manner. The tape is pulled out from the innermost convolution of the tape wound on the hub to be rewound on the outermost periphery of the wound tape through a pinch roller, etc. The above mentioned hub for taking up the tape is of double construction consisting of a driving wheel and a driven wheel incorporated with the driving wheel. A revolving plate is installed on the bottom of the driving to receive the tape. The revolving plate is equipped with a revolution transmission unit through which the revolving plate is operatingly connected to the pinch roller.

6 Claims, 2 Drawing Figures

CARTRIDGE FOR ENDLESS TAPE

DETAILED DESCRIPTION OF THE INVENTION

The present invention relates to an endless tape cartridge for magnetic sound-recording and playback by use of a magnetic looped tape of an endless array.

Hitherto when a looped endless magnetic tape is used in a cartridge known as a miniature casette, the endless tape is wound on a hub in a convoluted manner and the tape is carried out from the innermost convolution of the wound tape, then rewound on the outermost convolution after running over the wound tape on the outer periphery of the hub and further passing a tape driving unit and recording and playback unit to continuously run the tape endlessly. This prior method however has a disadvantage that a portion of the tape carried out from the innermost convolution should pass between the hub and the wound tape on the outer periphery of the hub and due to multiplied convolutions of the wound tape and particularly to tight winding of the central part there often occurred large frictional resistance between the hub and the tape undesirably causing tension in the part of friction and irregular running of tape, which may interfere with the continuous operation. Another disadvantage of this method is that the tape can not be pulled out from the wound tape revolving smoothly without losing its smoothness, and a thick tape only should be used.

The primary object of the present invention is to eliminate such disadvantages and to provide a simple method to facilitate the continuous operation of the endless tape by pulling smoothly the tape out of the wound tape in an endless tape casette, and taking up the carried-out tape easily, adequately and smoothly on the wound tape.

Another object of the present invention is to enable the endless tape of a looped type in a cartridge to run free of excessive load being applied in its operation and safely operated without breakage howsoever the tape is thin.

Still another object of the present invention is to provide an endless tape cartridge which is simple in construction, low cost and adapted for mass production.

To accomplish the above described object respectively, the present invention provides an endless tape cartridge, characterized by rotatably mounting a driving wheel for taking up the tape and a driven wheel to constitute a hub for winding up the tape, arranging the endless tape so as to be wound on the outer periphery of the hub, installing a revolving plate on the above mentioned driving or driven wheel to transmit the revolutional motion of a pinch roller to the revolving plate, then rewinding the carried-out tape on the outermost convolution of the same wound tape.

As the cartridge of the present invention has the construction as described above, the endless tape on the periphery of the hub can be pulled out very smoothly without friction, and the carried-out tape can be taken up without being pulled in the direction of revolution with ensuring continuous take-up of the tape with the revolution of the hub.

The present invention improves uneconomy to use thick tape. In other words, a thin endless tape can be operated continuously and smoothly without any trouble such as stop of the operation and breakage of the tape, and further the twists of the carried-out tape may be corrected smoothly.

Further, according to the present invention, the tape can be carried out with smooth rotation through the tape pulling-out position. Then, the carried-out tape is properly and trimly rewound on the multiplied convolutions of the wound tape with ease.

On the other hand, the tape can be very easily reversed without the damage of the tape and the increase of friction, with the result of ensuring a long life of the tape. In addition, long recording and reproduction can be realized, as a thin tape can be used, namely a larger amount of the tape can be wound on the hub. Accordingly, the endless tape cartridge of the present invention is small-sized, simple in construction and moderate in cost.

One embodiment of the present invention is shown in the accompanying drawings, in which.

Figure 1:
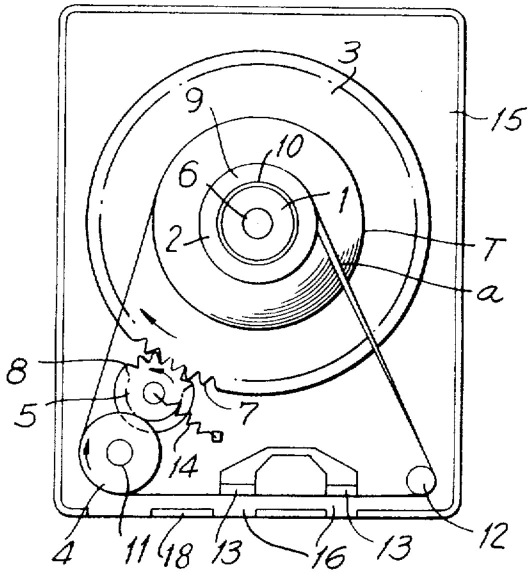
FIG. 1 is a plan view of the cartridge with a covering being removed.
Figure 2:
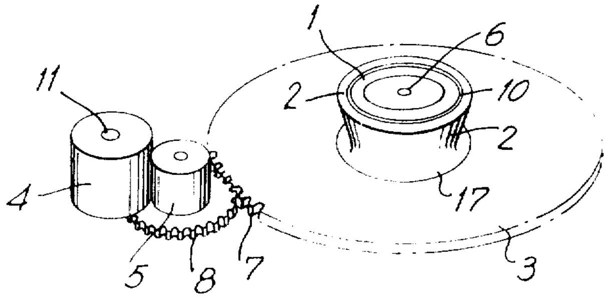
FIG. 2 is a perspective view of a guide roll of the tape.

The embodiment of the present invention will be explained as follows with reference to the drawings.

A hub of double construction is constituted by rotatably mounting an outer hub 2 as a driven wheel on the outer periphery of an inner hub as a driving wheel for taking up the tape. An endless tape T is wound on the outer periphery of the outer hub 2 to form the wound tape. The innermost convolution of the endless tape T wound on the outer periphery of the outer hub 2 is fed out to be carried out, the carried-out tape is rewound on the outer periphery of the wound tape after running over the wound tape and passing the driving unit and the recording and reproducing unit while correcting the twists of the carried-out tape.

The above described inner hub 1 is provided with a revolving plate 3, the revolving plate being connected to a freely revolving pinch roller 4 through an idler 5 to transmit the revolutional motion of the pinch roller to the revolving plate.

In the embodiment disclosed, the inner hub 1 has a supporting shaft 6 or a hole for the supporting shaft in its center. The inner hub 1 is also provided with the revolving plate 3 made of synthetic resin, teflon or polyacetal resin, etc. It is convenient to make the revolving plate 3 circular to use it as a reel disk for the tape T. A toothed part 7 is formed on said plate the outer periphery of the inner hub. Such toothed part is engaged with a toothed disk installed on the idler 5 driven by the pinch roller 4 to transmit the revolutional motion of the pinch roller 4 to the inner hub 1.

Meantime, the revolving plate 3 can be installed on the outer hub 2, if so desired. Moreover, the revolving plate 3 can be fittingly engaged with either hub against slip, instead of fixing it thereto. The inner hub 1 is fitted to a fitting hole 9 of the outer hub 2 with a slight clearance 10 between both hubs to cause partial friction to revolve the outer hub 2 at a slower speed than that of the inner hub 1 so as to realize planetary rotation. The hub of double construction can be constituted by rotatably mounting the outer hub 2 on the inner hub 1 so as to make the planetary rotation smooth by means of cushion such as felt or a rolling element such as a cylindrical roller or ball inserted in the clearance 10 to cause a slight friction.

As mentioned above, when the tape T is pulled out out of the innermost convolution of the wound tape *a*, it is necessary that the outer hub 2 should freely revolve with respect to the inner hub 1 to make the tape run smoothly. In such mechanism a thin tape can be used instead of a thick one. An antifriction sheet (not shown) made of teflon, graphite-teflon, etc., is fixedly disposed at the tape pulling-out portion *a* to carry out the tape wound on the outer periphery of the hub of double construction. The antifriction sheet is provided with an engaging slit for leading out the tape so as to pass the carried-out tape T from the wound tape on the hub through the slit smoothly so as to guide out the tape T during revolution. It is convenient to make the guided-out tape run on the upper side of the antifriction sheet and rewind on the outer periphery of the wound tape on the above outer hub 2 through the guide roll 4. In the drawings, 11 is a supporting shaft or the hole for the supporting shaft. 12 is a guide pole. 13 is a pressure pad for urging a magnetic head against the tape. 14 is a spring for pressing the idler 5 on the pinch roller 4 and the revolving plate 3. 15 is a cartridge case which can be split into two parts. 16 are windows for access by playback and recording heads. 17 is flange which is provided at the outer hub 2. 18 is a window for a capstan.

Meanwhile, the outer periphery of the outer hub 2 can be tapered so as to make the take-up of the wound tape more smoothly. On the other hand, the guide pole 12 can be inclined to any degree to make the correction of the twists of the running tape and the reversion of the tape more easily.

In this way, the revolutional motion of the pinch roller 4 is transmitted to the toothed disk 8 through the idler 5 to positively revolve the revolving plate 3 in mesh with the toothed disk 8 so as to drive the inner hub 1 and the outer hub 2 to cause planetary motion. Thus, the tape T wound on the revolving plate 3 in multiplied convolutions is led out through the tape pulling-out position, running smoothly in various ways on the wound tape so as to be fed by the capstan and the pinch roller 4 after passing the guide pole 12 to be rewound on the outer periphery of the wound tape. However, though the tape tends to be pulled in the direction of the revolution of the hub, when the hub of the driven wheel 2 revolves and at the same time the tape T is pulled out, the tape T is automatically pulled out on the upper side of the smooth sheet owing to the revolution of the revolving plate 3 and the planetary revolution of the hub. As a result, the tape is guided out continuously, running smoothly in various ways on the wound tape without failure of the operation caused by the tape pulled into the under side of the smooth sheet so as to be fed to the recording and reproducing unit and to be rewound on the outer periphery of the wound tape. In this case, the outer hub 2 as the driven wheel revolves on the inner hub 1 as the driving wheel in a planetary manner (i.e., the outer hub 2 revolves at a slower speed than that of the inner hub 1) to pull out the tape T more easily.

We claim:

1. Endless tape cartridge of double hub construction, comprising an inner driving wheel, an outer driven wheel surrounding said driving wheel, transmitting means for transmitting torque between said driving wheel and said driven wheel while permitting slippage therebetween, a disc mounted co-axially on said inner wheel, an endless coil of tape supported on said disc, a pinch roller rotatably mounted adjacent said disc and disposed for passage of said tape over the surface thereof, and connecting means other than said tape between said pinch roller and said disc such that rotation of said pinch roller results in rotation of said disc, said cartridge having a window providing access for an external capstan to drive said pinch roller, said disc and said tape coil without subjecting said tape to the tension required for driving said disc, said inner wheel, said outer wheel and said tape coil by stress in said tape.

2. Tape cartridge as defined in claim 1, wherein said transmitting means is a rolling element.

3. Tape cartridge as defined in claim 1, wherein said transmitting means is a felt cushion.

4. Tape cartridge as defined in claim 1, wherein said connecting means is an idler engaging said pinch roller and said disc.

5. Tape cartridge as defined in claim 4, wherein said idler comprises a toothed wheel, said disc comprises a toothed periphery, and said toothed wheel engages said toothed periphery for rotating said disc in the same sense as said pinch roller.

6. Tape cartridge as defined in claim 4, wherein said idler is urged against said pinch roller and said toothed gear by spring means.

* * * * *